United States Patent
Wire et al.

(10) Patent No.: US 11,089,728 B2
(45) Date of Patent: Aug. 17, 2021

(54) SYSTEM AND COMPUTER-IMPLEMENTED METHOD FOR CONTROLLING FREE WATER CONTENT IN CUT CROP MATERIAL

(71) Applicant: AGCO Corporation, Duluth, GA (US)

(72) Inventors: Jason Wire, Newton, KS (US); Dean Morrell, Duluth, GA (US); Grant Lewis Good, Moundridge, KS (US)

(73) Assignee: AGCO Corporation, Duluth, GA (US)

( * ) Notice: Subject to any disclaimer, the term of this patent is extended or adjusted under 35 U.S.C. 154(b) by 209 days.

(21) Appl. No.: 16/163,031

(22) Filed: Oct. 17, 2018

(65) Prior Publication Data

US 2019/0116733 A1 Apr. 25, 2019

Related U.S. Application Data

(60) Provisional application No. 62/575,205, filed on Oct. 20, 2017.

(51) Int. Cl.
*A01D 43/10* (2006.01)
*A01D 43/00* (2006.01)
(Continued)

(52) U.S. Cl.
CPC ......... *A01D 43/102* (2013.01); *A01D 43/085* (2013.01); *A01D 82/02* (2013.01); *A01B 79/005* (2013.01); *A01D 43/003* (2013.01)

(58) Field of Classification Search
CPC .. A01B 79/005; A01D 43/003; A01D 43/006; A01D 43/0633; A01D 43/08;
(Continued)

(56) References Cited

U.S. PATENT DOCUMENTS

| 4,767,067 A | * | 8/1988 | Bruer | A01D 43/08 241/101.742 |
| 4,912,914 A | * | 4/1990 | Wingard | A01D 43/003 34/113 |

(Continued)

FOREIGN PATENT DOCUMENTS

| CN | 203708836 U | | 7/2014 | |
| EP | 1166619 | * | 1/2002 | ............. A01D 43/08 |
| EP | 1166619 A1 | | 1/2002 | |

OTHER PUBLICATIONS

UK Intellectual Property Office, International Search Report for related UK Application No. GB1718446.6, dated Apr. 30, 2018.

*Primary Examiner* — Adam J Behrens

(57) ABSTRACT

A system and computer-implemented method for sensing an amount of free water in cut crop material and automatically adjusting an operating parameter of a mower conditioner to optimize the amount of free water. A sensor located at the exit of a conditioning mechanism measures an actual free water content value of the material as it exits the conditioning mechanism, a processor compares the actual value to maximum and minimum values, and if the actual value is outside this range, automatically adjusts an operating parameter, such as a gap between pairs of conditioning rollers, a pressure exerted by the rollers, or a speed of the mower conditioner, to optimize the actual value. Another sensor may be located at the entrance of the conditioning mechanism. The processor may take into account an operator-selectable value weighting the actual free water content versus a dry down time when adjusting the operating parameter.

18 Claims, 3 Drawing Sheets

(51) Int. Cl.
*A01D 43/08* (2006.01)
*A01D 82/02* (2006.01)
*A01D 82/00* (2006.01)
*A01B 79/00* (2006.01)

(58) Field of Classification Search
CPC .. A01D 43/081; A01D 43/085; A01D 43/102; A01D 43/10; A01D 42/00; A01D 82/02; A01D 34/00; A01D 34/42; A01D 34/63; A01D 34/66; A01D 34/664; A01D 34/665; A01D 34/667; A01D 34/8355; A01D 82/00
See application file for complete search history.

(56) References Cited

U.S. PATENT DOCUMENTS

| | | | | |
|---|---|---|---|---|
| 5,105,563 | A * | 4/1992 | Fingerson | A01D 43/003 34/203 |
| 6,389,884 | B1 * | 5/2002 | Diekhans | A01D 41/127 460/7 |
| 6,584,755 | B2 * | 7/2003 | Holtkotte | A01D 43/085 56/10.2 B |
| 8,554,424 | B2 * | 10/2013 | Kormann | A01D 43/085 460/1 |
| 9,807,940 | B2 * | 11/2017 | Roell | A01F 15/08 |
| 10,694,666 | B2 * | 6/2020 | Baum | A01D 43/073 |
| 2009/0120202 | A1 * | 5/2009 | Diekhans | A01D 43/085 73/861.02 |
| 2009/0312920 | A1 * | 12/2009 | Boenig | A01D 43/085 701/50 |
| 2012/0185140 | A1 * | 7/2012 | Kormann | A01D 43/085 701/50 |
| 2016/0198628 | A1 * | 7/2016 | Byttebier | A01D 69/03 56/10.2 B |
| 2017/0086381 | A1 * | 3/2017 | Roell | A01D 91/04 |
| 2018/0325031 | A1 * | 11/2018 | Rotole | A01D 41/127 |

* cited by examiner

SYSTEM AND COMPUTER-IMPLEMENTED METHOD FOR CONTROLLING FREE WATER CONTENT IN CUT CROP MATERIAL

CROSS REFERENCE TO RELATED APPLICATION

This application claims the benefit of U.S. Provisional Application No. 62/575,205 filed Oct. 20, 2017, which is hereby incorporated by reference in its entirety.

FIELD

The present invention relates to systems and methods for conditioning cut crops, and more particularly, embodiments concern a system and computer-implemented method for sensing an amount of free water in cut crop material and responsively adjusting one or more operating parameters of a mower conditioner in order to better control the amount of free water.

BACKGROUND

Producers of certain crops, such as hay, desire to maximize the quality of their crops, particularly with regard to optimizing the amount of free water. Both self-propelled and pulled mower conditioner machines, such as windrowers and swathers, are used to cut and condition these crops. The cut crop material is passed through one or more pairs of conditioning rollers, and then returned to the ground in the form of windrows or swathes to dry before being collected. The stems of the cut crop material are crimped or crushed as they pass between the rollers, which facilitates the subsequent drying process. The rollers of self-propelled mower conditioners are typically provided with hydraulic tensioning mechanisms which allow for varying the amount of pressure applied by the rollers to the cut crop material, while the rollers of pulled mower conditioners are typically provided with spring tensioning mechanisms for accomplishing the same purpose.

Over-conditioned cut crop material will suffer a loss of quality, while under-conditioned material will require additional dry down time. Historically, determining the condition of crops being cut has involved a manual process of making a subjective qualitative assessment of the amount of free water, and if necessary, manually adjusting the conditioning mechanism in order to optimize the amount of free water. These adjustments may include adjusting the pressure exerted by the rollers on the cut crop material and/or adjusting the size of the gap between the rollers through which the cut crop material travel.

This background discussion is intended to provide information related to the present invention which is not necessarily prior art.

SUMMARY

Embodiments address the above-described and other problems by providing a system and computer-implemented method for sensing an amount of free water in cut crop material and responsively adjusting one or more operating parameters of a mower conditioner in order to better control the amount of free water and thereby optimize the quality of the cut crop material.

In a first embodiment of the present invention, a system is provided for controlling a free water content of a crop material cut by a mower conditioner. The mower conditioner may include a crop cutting assembly configured to cut the crop material from a field, and a conditioning mechanism configured to receive and condition the crop material from the crop cutting assembly. The conditioning mechanism may include a pair of conditioning rollers configured to condition the crop material, and a tensioning mechanism configured to adjustably urge the conditioning rollers toward one another and resist their separation. The system may comprise a sensor configured to determine an actual free water content value reflecting an amount of free water in the crop material, and an electronic processing element in communication with the sensor and configured to perform an assessment and adjustment process to control the free water content. The assessment and adjustment process may include receiving the actual free water content value, comparing the actual free water content value to a threshold free water content value, and if the actual value exceeds the threshold value, automatically adjusting an operating parameter of the mower conditioner to optimize the actual value.

In a second embodiment, a mower conditioner is configured to control a free water content in a crop material cut by the mower conditioner. The mower conditioner may comprise a crop cutting assembly, a conditioning mechanism, one or more first and second sensors, and an electronic processing element. The crop cutting assembly may be configured to cut the crop material from a field, and the conditioning mechanism may be configured to receive and condition the crop material from the crop cutting assembly. The conditioning mechanism may include one or more pairs of conditioning rollers configured to condition the crop material, and a tensioning mechanism configured to adjustably urge the pairs of conditioning rollers toward one another and resist their separation. The first sensors may be located at an entrance of the conditioning mechanism, and configured to determine a first actual free water content value reflecting an amount of free water in the crop material entering the conditioning mechanism. The second sensors may be located at an exit of the conditioning mechanism, and configured to determine a second actual free water content value reflecting an amount of free water in the crop material exiting the conditioning mechanism. The processing element may be in communication with the first and second sensors, and configured to at least periodically perform an assessment and adjustment process to control the free water content during operation of the mower conditioner. The assessment and adjustment process may include receiving the first and second actual values, comparing the first and second actual values to first and second maximum free water content values, and if the first and second actual values exceed the first and second maximum values, automatically adjusting one or more operating parameters of the mower conditioner to optimize the second actual value.

In a third embodiment, a computer-implemented method is provided for improving the functioning of a computer for controlling a free water content in a crop material cut by a mower conditioner. The method may comprise the following steps. An actual free water content value reflecting an amount of free water in the crop material exiting a conditioning mechanism of the mower conditioner may be sensed. An assessment and adjustment process to control the free water content may be performed with an electronic processing element at least periodically during operation of the mower conditioner. The assessment and adjustment process may include receiving the actual free water content value, comparing the actual value to a threshold free water content value, if the actual value exceeds the threshold value, automatically adjusting an operating parameter of the mower conditioner to optimize the actual value, and communicating the actual value and the operating parameter adjusted by the processing element to a display for viewing by an operator of the mower conditioner.

Various implementations of the foregoing embodiments may include any one or more of the following additional features. The threshold free water content value may be a minimum and/or a maximum value. The sensors may be near-infrared spectrometers. The assessment and adjustment process may further include comparing the actual value to a minimum free water content value, and if the actual value is below the minimum value, automatically adjusting an operating parameter of the mower conditioner to optimize the actual value. The first sensors may be located at an entrance of the conditioning mechanism, and/or the second sensors may be located at an exit of the conditioning mechanism. The operating parameters may include a gap between each pair of conditioning rollers, which the processing element may adjusts by sending a control signal to a gap setting mechanism of the conditioning mechanism. The operating parameters may include a pressure exerted by each pair of conditioning rollers, which the processing element may adjust by sending a control signal to the tensioning assembly. The operating parameters may include a speed of the mower conditioner, which the processing element may adjust by sending a control signal to a speed controller of the mower conditioner. The assessment and adjustment process may further include communicating the actual value and the adjusted operating parameter to a display for viewing by an operator of the mower conditioner. The processing element may be further configured to receive an operator-selectable weight value weighting the actual value versus a dry down time, and to consider the operator-selectable weight value when adjusting the operating parameter. The assessment and adjustment process may be performed periodically or continuously during operation of the mower conditioner.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments provide a system and method for sensing a condition of cut crop material and responsively adjusting a parameter of a mower conditioner to improve the condition. More particularly, embodiments provide a system and computer-implemented method for sensing an amount of free water in cut crop material and responsively adjusting one or more operating parameters of a mower conditioner in order to better control the amount of free water and thereby optimize the quality of the cut crop material.

Figure 1:
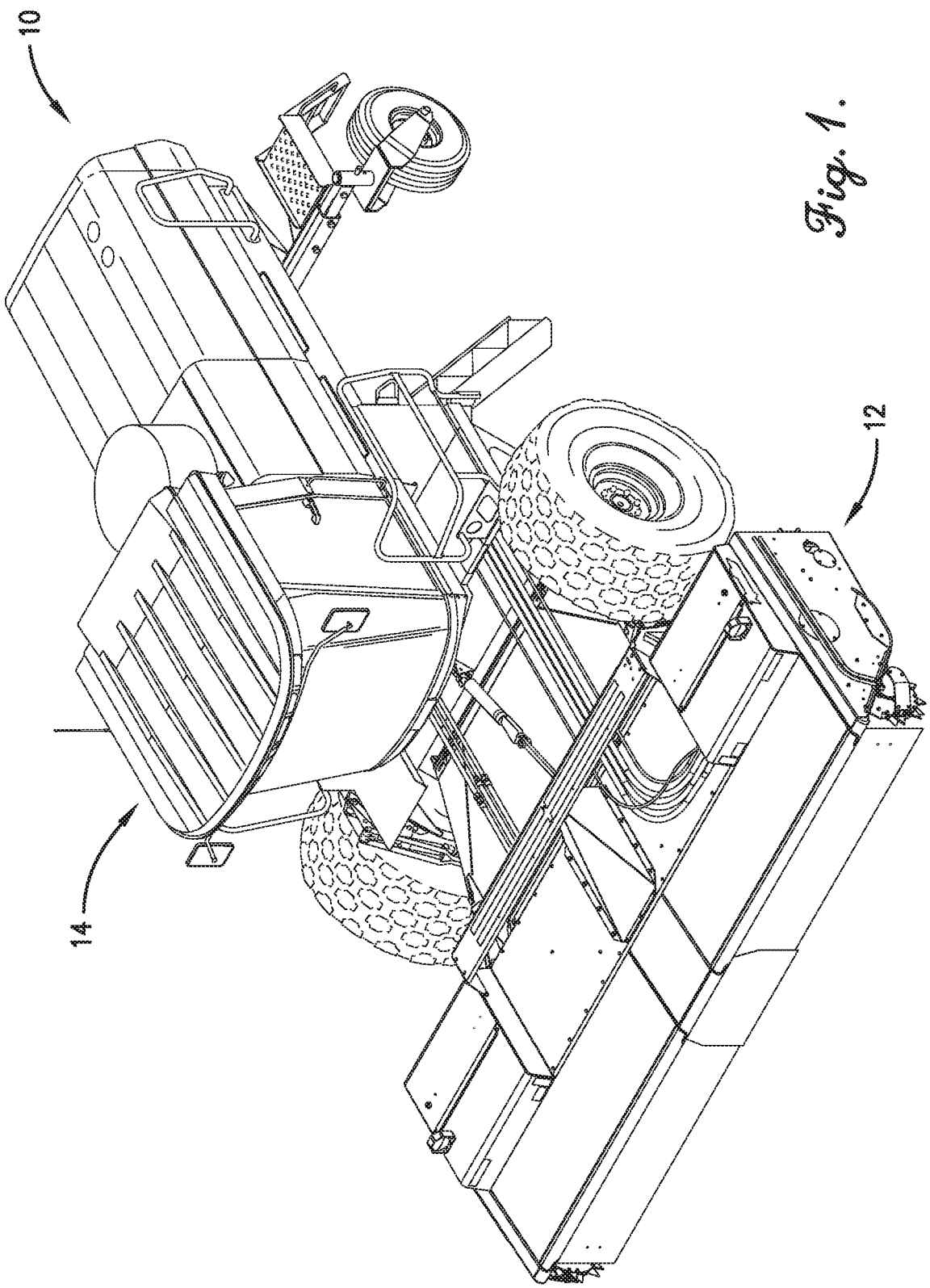
FIG. 1 is a perspective view of an exemplary mower conditioner incorporating an embodiment of a system for controlling an amount free water in cut crop material in a mower conditioner.
Figure 2:
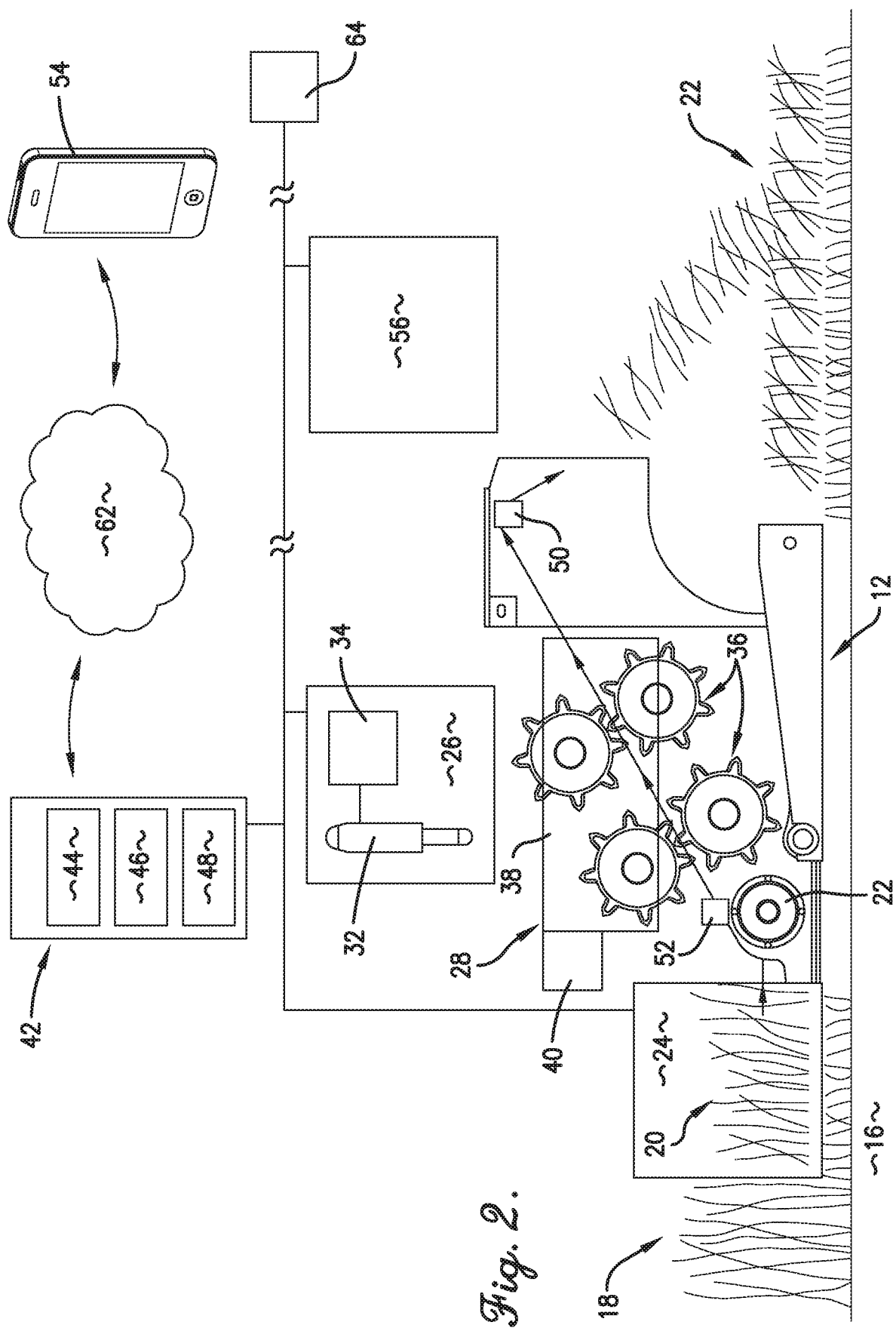
FIG. 2 is a fragmentary, cross-sectional, elevation diagramatical view of a portion of the mower conditioner of FIG. 1 where the system is located.

Referring to FIGS. 1 and 2, an exemplary mower conditioner 10 may broadly include a header 12. The mower conditioner 10 may be self-propelled, in which case the header 12 may be coupled to the front of a vehicle having a cab 14, or the mower conditioner 10 may be pulled, in which case the header 12 may be coupled to the rear of a tractor or other towing vehicle (not shown). In both cases, the header 12 may be made to move over a field 16 of standing crop material 18, cut the crop material from the ground, condition the cut crop material 20 as it passes rearwardly through the header 12, and then return the conditioned crop material to the ground in the form of windrows or swathes 22 for drying and subsequent collection.

Referring specifically to FIG. 2, the header 12 may broadly include a crop cutting assembly 24, a lift mechanism 26, and a conditioning mechanism 28. The crop cutting assembly 24 may be configured to cut the crop material from the ground. The crop cutting assembly 24 may employ substantially any suitable crop cutting technology, such as a conventional rotary-type cutter bed or a conventional sickle-type cutter bed. A helper roller 22 may be provided for urging the cut crop material rearward toward the conditioning mechanism 28.

The lift mechanism 26 may be configured to raise and lower at least the crop cutting assembly 24 to a desired cutting height during operation, and to raise and lower the entire header 12 to, respectively, a non-operational transport height and an operational height. The lift mechanism 26 may employ substantially any suitable lifting technology, such as a hydraulic mechanism or a mechanical mechanism. In one implementation, the lift mechanism 26 may include at least one lift cylinder 32 and at least one hydraulic lift circuit 34 configured to control the movement of hydraulic fluid to and from the lift cylinder 32 to, respectively, raise and lower the crop-cutting assembly 24 and/or the header 12.

The conditioning mechanism 28 may be configured to receive and condition the cut crop material from the crop cutting assembly 24. The conditioning mechanism 28 may employ substantially any suitable conditioning technology.

In one implementation, the conditioning mechanism 28 may include one or more pairs of counter-rotating conditioning rollers 36 configured to condition the crop material, a tensioning mechanism 38 configured to adjustably urge the paired rollers 36 toward one another and resist their separation, and a gap setting mechanism 40 configured to set an adjustable gap between the paired rollers 36.

The conditioning rollers 36 may have relatively non-compressible surfaces made of a hard material, and may take the form of fluted or ribbed steel rollers. Alternatively, the rollers 36 may have relatively compressible surfaces made of rubber or a combination of rubber and steel. Each roller may have a series of radially outwardly projecting ribs that extend along the length of the roller in a helical pattern. The ribs may be spaced around each roller in such a manner that the ribs on one roller intermesh with the ribs of the other paired roller during operation in order to crimp the cut crop material. Alternatively, the rollers may be non-intermeshing in order to crush rather than crimp the cut crop material.

Each pair of conditioning rollers 36 may be mounted in such a way that the one roller is moveable toward and away from the other paired roller, while the position of the latter remains fixed. Alternatively, both rollers may be moveable toward and away from each other. The tensioning mechanism 38 may be configured to adjust a force on one or both of the paired rollers 36 to urge the rollers together to an extent permitted by the gap setting mechanism 40 which sets a running gap between each pair of rollers 36. The tensioning mechanism 38 may employ substantially any suitable technology, such as hydraulic tensioning technology or spring tensioning technology. Different conditions may call for different tension settings on the rollers and/or different gap settings between the rollers.

The mower conditioner 10 may further include an assessment and adjustment system 42 for controlling the amount of free water in the cut crop material. The system 42 may comprising an electronic communications element 44, an electronic memory element 46, an electronic processing element 48, and one or more (e.g., first and second) sensors 50, 52. The communications element 44 may be configured to transmit and receive signal traffic between, e.g., the memory element 46, the processing element 48, and the sensors 50, 52. More broadly, the communications element 44 may facilitate communications between various data sources and various interface devices (e.g., a mobile communications device 54 and/or a fixed display 56 in the cab 14 of the mower conditioner 10 (or in a cab of a corresponding towing vehicle). The communications element 44 may employ substantially any suitable electronic communications technology, such as one or more transceivers (e.g., WWAN, WLAN, and/or WPAN transceivers) functioning in accordance with IEEE standards, 3GPP standards, or other standards, and configured to receive and transmit signals. The communications element 44 may make use of a wired (e.g., a data bus) communication system 60 and/or a wireless (e.g., a network) communications system 62. The wireless communications system 62 may employ substantially any suitable network standard or technology, such as GSM, CDMA, TDMA, WCDMA, LTE, EDGE, OFDM, GPRS, EV-DO, UWB, WiFi, IEEE 802 including Ethernet, WiMAX, and/or others, and may include or support various local area networks (LANs), personal area networks (PAN), or short range communications protocols.

The memory element 46 may be configured to store relevant data for access and use by, e.g., the processing element 48. In particular, the memory element 46 may store one or more (e.g., first and second) threshold free water values, which may be minimum and/or maximum free water values. The memory element 46 may employ substantially any suitable electronic memory technology, such as one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing element 48 may be configured to receive and analyze data and automatically take action and/or communicate based on the results. In particular, the processing element 48 may be configured to receive data from the sensors 50, 52, analyze the data, and or send control signals to automatically adjust one or more relevant operating parameters of the mower conditioner 10 and/or communicate the results via the display devices 54, 56 for consideration by an operator of the mower conditioner 10.

The one or more sensors 50, 52 may be configured to measure the actual amount of free water in the cut crop material when it enters and/or exits the conditioning mechanism 28, and to communicate this data to the memory element 46 and/or the processing element 48 via the communications element 44. In one implementation, one or more first sensors 50 may be located at or proximate to an entrance of the conditioning mechanism 28, or otherwise exposed to crop material entering the conditioning mechanism 28, and one or more second sensors may be located at or proximate to an exit of the conditioning mechanism 28, or otherwise exposed to crop material exiting the conditioning mechanism 28 (e.g., on or near a windguard positioned over a rear portion of the header 12 and against which the exiting conditioned cut crop material may impinge). The sensors 50, 52 may employ substantially any suitable technology for measuring free water content, such as near infrared spectrometer, infrared thermal, capacitance, electrical resistance/conductance, or microwave absorption.

Figure 3:
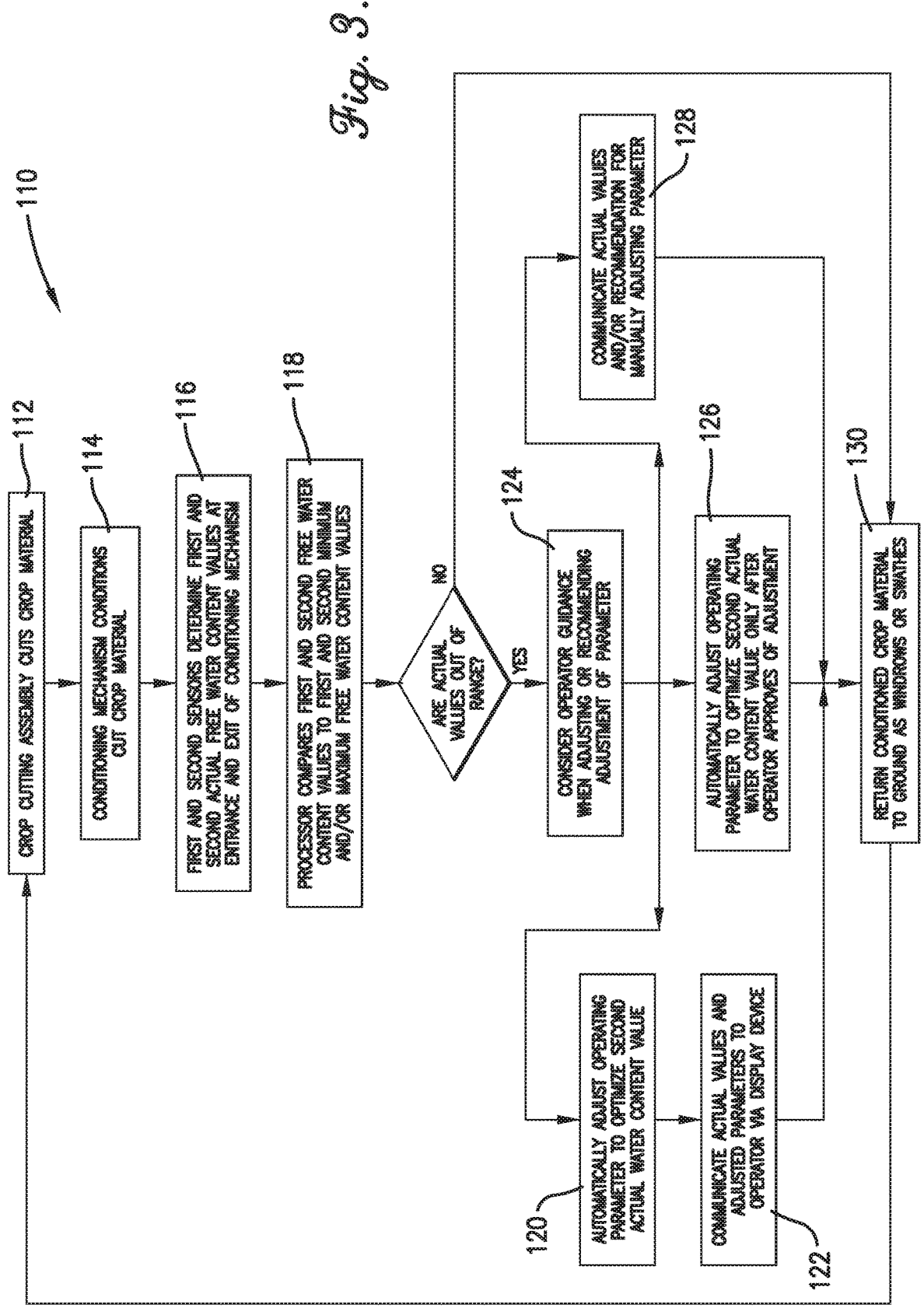
FIG. 3 is a flowchart of steps involved in operation of an embodiment of the system for controlling an amount of free water in cut crop material in a mower conditioner.

Referring also to FIG. 3, in operation, as the header 12 is made to move over the field 16 of standing crop material 18, the crop cutting assembly 24 may cut the crop material from the ground, as shown in 112, and the conditioning mechanism 26 may condition the cut crop material 20 as it passes rearwardly through the header 12, as shown in 114.

In one implementation, the one or more first sensors 50 may determine a first actual free water content value reflecting an actual amount of free water in the cut crop material 20 as the cut crop material 20 enters the conditioning mechanism 28, and the one or more second sensors 52 may determine a second actual free water content value reflecting an actual amount of free water in the conditioned crop material as the conditioned crop material exits the conditioning mechanism 28, as shown in 116. In other implementations, only the first or the second sensors may be employed, such that the actual free water content value is determined either at the entrance or at the exit, but not both. In general, it may be preferable to determine the actual free water content value at least of the conditioned cut crops (i.e., at the exit of the conditioning mechanism 28).

The processing element 48 may receive the one or more actual free water content values via the communications element 44, compare the actual free water content values to one or more threshold (i.e., minimum and/or maximum) free water content values stored in the memory element 46, as shown in 118, and if the factual free water content values exceed (i.e., are below a minimum or above a maximum) or are outside of the range established by the threshold free water content values, automatically transmit one or more control signals to adjust at least one of one or more operating parameters of the mower conditioner 10, as shown in 120, to optimize the second actual free water content value of the conditioned cut crop material, and thereby optimize its quality. The adjustable operating parameters may include the gap between pairs of conditioning rollers 36, which may be controlled by sending a control signal to the gap setting mechanism 40; the pressure exerted by the rollers 36, which may be controlled by sending a control signal to the tension mechanism 38; and/or the speed of the mower conditioner 10, which may be controlled by sending a signal to a speed controller 64 of the mower conditioner 10. Additionally, the processing element 48 may communicate the actual free water content values and/or the one or more operational parameter adjustments to an operator of the mower conditioner 10 via the display device 54, 56, as shown in 122.

In one implementation, an operator-selectable weight value which weights quality versus dry down time may be added to accommodate the desires or needs of particular operators. For example, one operator may wish to optimize quality with less regard to dry down time, while another operator may wish to minimize dry down time with less regard to quality. Each such operator may enter their preferred operator-selectable weight value into the memory element 46 for consideration by the processing element 48 when adjusting (or recommending adjustment of) the one or more operating parameters of the mower conditioner 10, as shown in 124.

In one implementation, the processing element 48 may not automatically adjust the one or more operating parameters until approved by the operator, as shown in 126. In another implementation, the processing element 48 may only communicate the sensed actual free water content values and/or a recommendation to adjust the one or more operating parameters, and the operator may then manually adjust the operating parameters, as shown in 128.

Whether adjustments are made or not, the conditioned crop material may be returned to the ground in the form of windrows or swathes 22, as shown in 130, for drying and subsequent collection.

This process of assessment and adjustment may be repeated periodically (e.g., at intervals of between one (1) minute and five (5) minutes, or less than one (1) minute) or continuously during operation of the mower conditioner 10 in order to achieve and maintain the desired condition of the cut crop material.

Thus, it will be appreciated that embodiments of the present invention provide several advantages over the prior art, including making an objective (rather than a subjective) qualitative assessment of the amount of free water; if necessary, automatically (rather than manually) adjusting the relevant parameters of the mower conditioner in order to optimize the amount of free water; and periodically or continuously repeating this process of assessment and adjustment.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for controlling a free water content of a crop material cut by a mower conditioner, the mower conditioner including:
    a crop cutting assembly configured to cut the crop material from a field;
    a conditioning mechanism configured to receive and condition the crop material from the crop cutting assembly, the conditioning mechanism including:
        a pair of conditioning rollers configured to condition the crop material;
        a tensioning mechanism configured to adjustably urge the pair of conditioning rollers toward one another and resist their separation;
    the system comprising:
        a sensor configured to determine an actual free water content value reflecting an amount of free water in the crop material;
        an electronic processing element in communication with the sensor and configured to perform an assessment and adjustment process to control the free water content including:
        receiving the actual free water content value;
        receiving an operator-selectable weight value weighting the actual free water content value versus a dry down time;
        comparing the actual free water content value to a threshold free water content value, an if the actual free water content value exceeds the threshold free water content value, automatically adjusting an operating parameter of the mower conditioner to optimize the actual free water content value, and considering the operator-selectable weight value when adjusting the operating parameter of the mower conditioner to optimize the actual free water content value.

2. The system of claim 1, wherein the threshold free water content is a minimum free water content.

3. The system of claim 1, wherein the threshold free water content is a maximum free water content.

4. The system of claim 1, wherein the sensor is located at an entrance of the conditioning mechanism.

5. The system of claim 1, wherein the sensor is located at an exit of the conditioning mechanism.

6. The system of claim 1, wherein the operating parameter adjusted by the electronic processing element includes a gap between the pair of conditioning rollers, which the electronic processing element adjusts by sending a control signal to a gap setting mechanism of the conditioning mechanism.

7. The system of claim 1, wherein the operating parameter adjusted by the electronic processing element includes a pressure exerted by the pair of conditioning rollers, which the electronic processing element adjusts by sending a control signal to the tensioning mechanism.

8. The system of claim 1, wherein the operating parameter adjusted by the electronic processing element includes a speed of the mower conditioner, which the electronic processing element adjusts by sending a control signal to a speed controller of the mower conditioner.

9. The system of claim 1, wherein the assessment and adjustment process further includes communicating the actual free water content value and the operating parameter adjusted by the electronic processing element to a display for viewing by an operator of the mower conditioner.

10. The system of claim 1, the electronic processing element being further configured to at least periodically perform the assessment and adjustment process during operation of the mower conditioner.

11. A mower conditioner configured to control a free water content of a crop material cut by the mower conditioner, the mower conditioner comprising:

a crop cutting assembly configured to cut the crop material from a field;
a conditioning mechanism configured to receive and condition the crop material from the crop cutting assembly, the conditioning mechanism including
one or more pairs of conditioning rollers configured to condition the crop material, and
a tensioning mechanism configured to adjustably urge the one or more pairs of conditioning rollers toward one another and resist their separation;
one or more first sensors located at an entrance of the conditioning mechanism, and configured to determine a first actual free water content value reflecting an amount of free water in the crop material entering the conditioning mechanism;
one or more second sensors located at an exit of the conditioning mechanism, and configured to determine a second actual free water content value reflecting an amount of free water in the conditioned crop material exiting the conditioning mechanism; and
an electronic processing element in communication with the one or more first and second sensors and configured to at least periodically perform an assessment and adjustment process to control the free water content during operation of the mower conditioner, the assessment and adjustment process including:
receiving the first and second actual free water content values;
receiving an operator-selectable weight value weighting the first and second actual free water content values versus a dry down time;
comparing the first and second actual free water content values to first and second maximum free water content values, and
if the first and second actual free water content values exceed the first and second maximum free water content values, automatically adjusting one or more operating parameters of the mower conditioner to optimize the second actual free water content value, and considering the operator-selectable weight value when adjusting the one or more operating parameters of the mower conditioner to optimize the second actual free water content value.

12. The mower conditioner of claim 11, wherein the assessment and adjustment process further includes
comparing the first and second actual free water content values to first and second minimum free water content values, and
if the first and second actual free water content values are below the first and second minimum free water content values, automatically adjusting one or more operating parameters of the mower conditioner to optimize the second actual free water content value.

13. The mower conditioner of claim 11, wherein the one or more operating parameters adjusted by the electronic processing element include a gap between the one or more pairs of conditioning rollers, which the electronic processing element adjusts by sending a control signal to a gap setting mechanism of the conditioning mechanism.

14. The mower conditioner of claim 11, wherein the one or more operating parameters adjusted by the electronic processing element include a pressure exerted by the one or more pairs of conditioning rollers which the electronic processing element adjusts by sending a control signal to the tensioning mechanism.

15. The mower conditioner of claim 11, wherein the one or more operating parameters adjusted by the electronic processing element include a speed of the mower conditioner, which the electronic processing element adjusts by sending a control signal to a speed controller of the mower conditioner.

16. The mower conditioner of claim 11, wherein the electronic processing element is further configured to communicate the first and second actual free water content values and the one or more operating parameters adjusted by the electronic processing element to a display for viewing by an operator of the mower conditioner.

17. The mower conditioner of claim 11, the electronic processing element being further configured to continuously perform the assessment and adjustment process during operation of the mower conditioner.

18. A computer-implemented method for improving the function of a computer for controlling a free water content in a crop material cut by a mower conditioner, the computer-implemented method comprising:
sensing an actual free water content value reflecting an amount of free water in the crop material exiting a conditioning mechanism of the mower conditioner; and
performing with an electronic processing element an assessment and adjustment process to control the free water content at least periodically during operation of the mower conditioner, the assessment and adjustment process including
receiving the actual free water content value,
receiving an operator-selectable weight value weighting the actual free water content value versus a dry down time;
comparing the free water content value to a threshold free water content value,
if the free water content value exceeds the threshold free water content value, automatically adjusting an operating parameter of the mower conditioner to optimize the actual free water content value and considering the operator-selectable weight value when adjusting the operating parameter of the mower conditioner to optimize the actual free water content value, and
communicating the actual free water content value and the operating parameter adjusted by the electronic processing element to a display for viewing by an operator of the mower conditioner.

* * * * *